Patented July 1, 1952

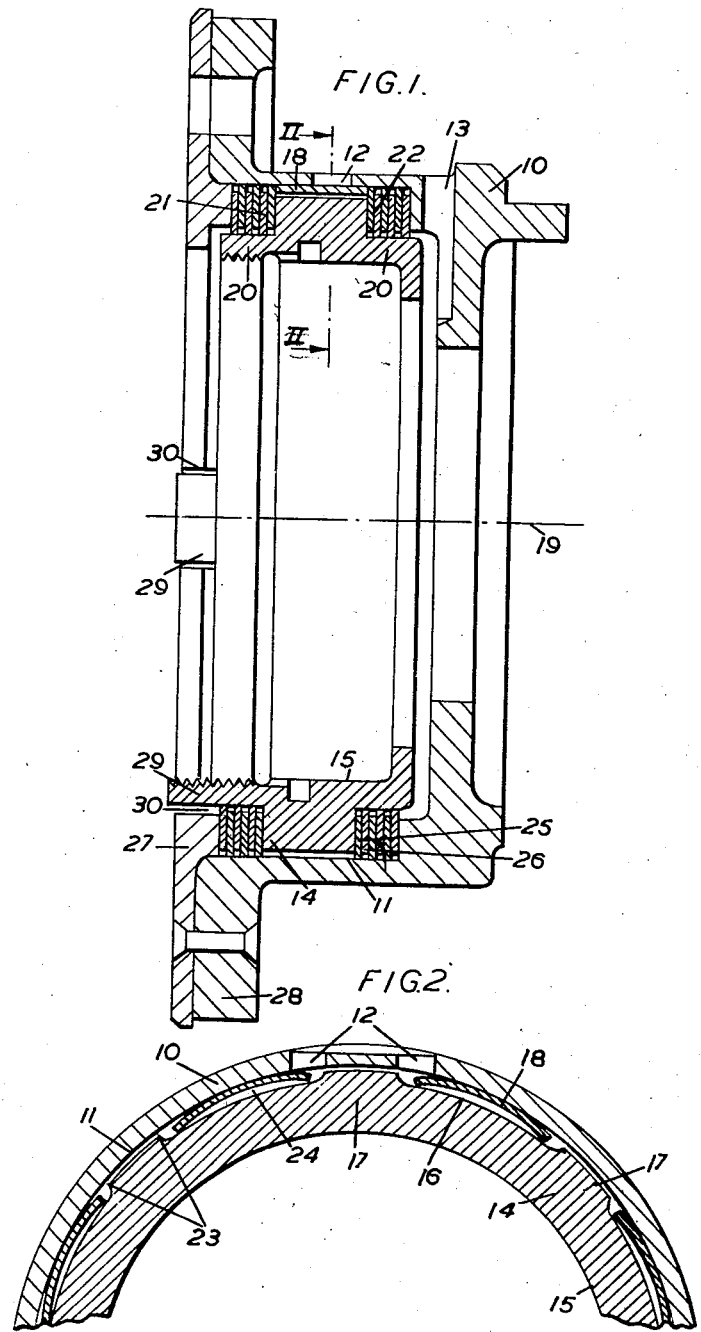

2,602,009

UNITED STATES PATENT OFFICE 2,602,009

BEARING MOUNTING

Benjamin William Barlow, Sudbury, and Edward Alec Simonis, Harrow, England, assignors to D. Napier & Son Limited, London, England, a company of Great Britain Application April 19, 1949, Serial No. 88,422
In Great Britain July 28, 1948

11 Claims. (Cl. 308—26)

This invention relates to mountings for bearings and has for its object to provide a mounting for a bearing, particularly for supporting high speed rotary units such as the rotors of gas turbines and the like, which will tend to prevent vibration due to slight out of balance of the rotors by allowing the shaft to rotate about its mass centre rather than about its geometrical centre, where these centres are not coincident. It will also tend to absorb vibrations due to other causes, and will allow for differential expansions or contractions due to temperature differences in different parts of the mounting.

According to the present invention a mounting for a bearing for a rotor comprises an inner sleeve constituting or carrying the outer member of the bearing, an outer sleeve or support within which the inner sleeve lies with a clearance between them, a resilient strip or strips disposed circumferentially between the inner and outer sleeves the strip or strips being shaped so as to engage the inner and outer sleeves at spaced points but not to be wholly contiguous with either and so divide the said clearance into a series of chambers, liquid filling the chambers, and end seals substantially closing the axial extremities of the chambers.

Conveniently there are several resilient strips which tend to maintain substantial concentricity of the inner and outer sleeves, and each of these strips lies between two abutments on the inner or outer sleeve which abutments serve as spacing members to determine the maximum relative radial movement which can take place between the inner and outer sleeves.

It will be seen that the sleeves are capable of limited relative radial movement with flexure of the strips but that such movement, when the chambers are filled with liquid, necessitates flow of liquid between the chambers since any such movement causes some of the chambers to be enlarged and others to be reduced in size. Since such flow of liquid between the chambers can only take place either between the interengaging surfaces of the resilient strips and the sleeves or past the seals at the ends of the chambers it will be seen that any rapid relative radial movements such as may tend to occur due to vibration will tend to be damped out. Thus, the arrangement as well as permitting a limited degree of self-aligning action by reason of the ability of the inner sleeve to move radially relatively to the outer sleeve within small limits also allows the shaft to rotate about a centre which does not exactly coincide with its geometric centre, but will tend to damp out any rapid vibratory or other movements.

The form of the end seals for the chambers may vary but in one arrangement one or each of such end seals comprise at least two annular discs lying face to face, one making a close circumferential fit within the outer sleeve and being spaced by a small radial distance from the inner sleeve while the other makes a close circumferential fit on the inner sleeve and is spaced by a small radial distance from the outer sleeve, one of such discs being spaced by a slight clearance from the adjacent end or ends of the resilient strip or strips. Alternatively a piston ring type of seal comprising a ring disposed in a groove in one of the sleeves and resiliently engaging the other sleeve and spaced by a slight clearance from the end or ends of the resilient strip or strips may be used.

In any case the form of the resilient strip or strips may vary but in one convenient arrangement there are several resilient strips and each strip, regarded in cross-section in a plane normal to the axis of the bearing, engages one of the sleeves adjacent to the edges of the strip and the other sleeve adjacent to the centre of its width.

The invention may be carried into practice in various ways, but one particular form of bearing mounting intended for the rotor shaft of a turbo-blower will be described by way of example with reference to the accompanying drawings, in which:

Figure 1 is a sectional elevation of the bearing mounting, and

Figure 2 is a fragmentary cross-section taken on the line II—II in Figure 1.

The mounting comprises an outer sleeve 10 intended for rigid mounting in the casing of the turbo-blower. The outer sleeve is formed with a cylindrical inner surface 11 and has passages 12 and 13 in its circumference for supplying oil to its interior.

Disposed within the outer sleeve 10 and substantially concentrically therewith is an inner sleeve 14 which is internally cylindrical at 15 for receiving the outer race of the ball or roller journal bearing (not shown) which the mounting is to support. As shown best in Figure 2, the outer surface of the inner sleeve 14 is formed as a series of relatively wide longitudinal grooves 16 separated from one another by relatively narrow longitudinal ribs 17, the overall outside diameter of the inner sleeve 14 being slightly less than the internal diameter of the outer sleeve 10, so that when the inner sleeve is concentric with the outer sleeve there is a small clearance between the ribs 17 and the inner cylindrical surface 11 of the outer sleeve.

Disposed in each of the longitudinal grooves 16 is a resilient rectangular metal strip 18 each of such curved form in cross-section in planes normal to the axis 19 of the inner sleeve that it engages the inner sleeve along lines at or near to its sides and the outer sleeve along a line at or near to the centre of its width. The edges of each strip 18 lie close to the two ribs 17 bounding the groove 16 within which it lies, but there is a clearance at these places so as to permit the strip to flatten slightly without being jammed tightly between the two ribs.

At each end of the inner sleeve 14 are cylindrical portions 20 of a radius somewhat smaller than that of the bases of the grooves 16, thus providing annular spaces between the end portions of the inner and outer sleeves, with which spaces the grooves 16 communicate. The resilient strips 18 are very slightly shorter in the axial direction than the grooves 16 and the ribs 17, and arranged in each of the annular spaces are end seals 21 and 22 for substantially closing the ends of the chambers 23 and 24 formed by the grooves 16, the strips 18 and the inner surface 11 of the outer sleeve 10. Each end seal 21 or 22 comprises a flat ring 25 making a close sealing fit with the inner circumference 11 of the outer sleeve and engaging the adjacent ends of the ribs 17 but having a radial clearance from the outer circumference of the end cylindrical portion 20 of the inner sleeve and a small axial clearance from the adjacent ends of the strips 18 of the order of a few thousandths of an inch. Arranged in close contact with this flat ring 25 is a second flat ring 26 which makes a close fit with the end cylindrical portion 20 of the inner sleeve but which is spaced from the inner circumference 11 of the outer sleeve by a radial clearance. Next to this second ring 26 is a third flat ring similar to the first flat ring 25, and next to the third flat ring is a fourth flat ring similar to the second flat ring 26. A fifth and sixth ring are arranged in a similar manner, the thickness of the sixth ring being selected to give a suitable degree of freedom for radial movement to the inner sleeve 14 when the parts are assembled. The inner sleeve 14 and the end seals 21 and 22 are held in place in the axial direction within the outer sleeve 10 by an end plate 27 which is riveted to an outwardly extending flange 28 on the outer sleeve 10. One or more dogs or projections 29 are formed on the inner sleeve 14 which are a free fit in slots 30 in the end plate 27, to prevent significant relative rotation of the inner and outer sleeves.

The chambers and clearances in the mounting are filled with oil on assembly, and additional oil can enter through the passages 12 to replace any oil which may leak away in service through the end seals. The bearing is lubricated by oil entering through the passage 13.

Should the axis of the shaft supported by the bearing tend to move rapidly in an orbit the resilient strips 18, which are curved circumferentially as shown in Fig. 2, will be slightly flattened in succession, thus successively reducing and increasing the volumes of the chambers 23 and 24. Oil can only flow into or out of these chambers either under the sides of the resilient strips 18 or between the ends of the strips and the end seals, and there is therefore considerable resistance to such changes in volume, which tends to damp out such orbital movements of the shaft. On the other hand, should the shaft tend to rotate about a stationary axis which is slightly eccentric with respect to the outer sleeve, the mounting will permit this eccentricity to an extent which is limited by the contact of a rib 17 with the inner cylindrical surface 11 of the outer sleeve. Should the temperature of the casing supporting the outer sleeve 10 and/or the outer sleeve itself become substantially different from the temperature of the rotating shaft, the mounting will allow for differential expansions or contractions between these parts without the clearances of the bearing itself being appreciably affected.

It will be understood that the number and dimensions of the chambers formed by the inner and outer sleeves and the resilient strips, the form of the inner and outer sleeves, the means for sealing the ends of the chambers referred to and other details of construction may be varied as desirable to meet requirements without departing from this invention.

Further where an outer sleeve is referred to herein this is to be understood as including any supporting part or structure having a cylindrical bore in which the inner sleeve lies.

What we claim as our invention and desire to secure by Letters Patent is:

1. A mounting for a bearing for a rotor comprising an inner sleeve, an outer sleeve within which said inner sleeve lies with a clearance between them, at least one resilient strip disposed circumferentially between said sleeves and shaped so as to engage both said sleeves at spaced points thus forming a series of chambers between itself and the said sleeves, liquid filling said chambers, and end seals in close proximity to the ends of said resilient strip substantially closing the axial extremities of said chambers.

2. A mounting for a bearing as claimed in claim 1, in which at least one of the end seals consists of at least two annular discs lying face to face, one making a close circumferential fit within the outer sleeve and being spaced by a radial distance from the inner sleeve while the other makes a close circumferential fit on the inner sleeve and is spaced by a radial distance from the outer sleeve, one of such discs being spaced by a slight clearance from the adjacent end or ends of the resilient strip or strips.

3. A mounting for a bearing for a rotor comprising an inner sleeve, an outer sleeve within which said inner sleeve lies with a clearance between them, a series of spaced abutments on at least one of said sleeves lying in said clearance and adapted to determine the maximum radial movement which can take place between said sleeves, a plurality of resilient strips disposed circumferentially between said sleeves and lying between said abutments, said resilient strips each being shaped so as to engage both said sleeves at spaced points thus forming a series of chambers bounded by the said strips and the said sleeves, liquid filling said chambers, and end seals in close proximity to the ends of said resilient strips substantially closing the axial extremities of said chambers.

4. A mounting as claimed in claim 3, in which each of said resilient strips is adapted to engage one of said sleeves on a line adjacent to its sides and to engage the other of said sleeves on a line adjacent to the centre of its width.

5. A mounting for a bearing for a rotor comprising an inner sleeve, an outer sleeve within which said inner sleeve lies with a clearance between them, at least one resilient strip disposed circumferentially between said sleeves and shaped so as to engage both said sleeves at spaced points thus forming a series of chambers between itself and the said sleeves, liquid filling said chambers, end seals in close proximity to the ends of said resilient strip substantially closing the axial extremities of said chambers, and means in the outer sleeve for delivering liquid continuously during operation to the said clearance.

6. A mounting for a bearing for a rotor comprising an inner sleeve carrying the outer race of the bearing, an outer sleeve within which said inner sleeve lies with a clearance between them, at least one resilient strip disposed circumferentially between said sleeves and shaped so as to engage both said sleeves at spaced points thus forming a series of chambers between itself and the said sleeves, liquid filling said chambers, and end seals in close proximity to the ends of said resilient strip substantially closing the axial extremities of said chambers.

7. A mounting for a bearing as claimed in claim 6, in which at least one of the end seals consists of at least two annular discs lying face to face, one making a close circumferential fit within the outer sleeve and being spaced by a radial distance from the inner sleeve while the other makes a close circumferential fit on the inner sleeve and is spaced by a radial distance from the outer sleeve, one of such discs being spaced by a slight clearance from the adjacent end or ends of the resilient strip or strips.

8. A mounting for a bearing for a rotor comprising an inner sleeve carrying the outer race of the bearing, an outer sleeve within which said inner sleeve lies with a clearance between them, a series of spaced abutments on at least one of said sleeves lying in said clearance and adapted to determine the maximum radial movement which can take place between said sleeves, a plurality of resilient strips disposed circumferentially between said sleeves and lying between said abutments, said resilient strips each being shaped so as to engage both said sleeves at spaced points thus forming a series of chambers bounded by the said strips and the said sleeves, liquid filling said chambers, and end seals in close proximity to the ends of said resilient strips substantially closing the axial extremities of said chambers.

9. A mounting as claimed in claim 8, in which each of said resilient strips is adapted to engage one of said sleeves on a line adjacent to its sides and to engage the other of said sleeves on a line adjacent to the centre of its width.

10. A mounting for a bearing for a rotor comprising an inner sleeve carrying the outer race of the bearing, an outer sleeve within which said inner sleeve lies with a clearance between them, at least one resilient strip disposed circumferentially between said sleeves and shaped so as to engage both said sleeves at spaced points thus forming a series of chambers between itself and the said sleeves, liquid filling said chambers, end seals in close proximity to the ends of said resilient strip substantially closing the axial extremities of said chambers, and means in the outer sleeve for delivering liquid continuously during operation to the said clearance.

11. A mounting as claimed in claim 10, in which at least one of the end seals consists of at least two annular discs lying face to face one making a close circumferential fit within the outer sleeve and being spaced by a radial distance from the inner sleeve while the other makes a close circumferential fit on the inner sleeve and is spaced by a radial distance from the outer sleeve, one of such discs being spaced by a slight clearance from the adjacent end or ends of the resilient strip or strips.

BENJAMIN WILLIAM BARLOW.
EDWARD ALEC SIMONIS.

REFERENCES CITED

The following references are of record in the file of this patent:

UNITED STATES PATENTS

| Number | Name | Date |
| --- | --- | --- |
| 2,012,997 | Junkers | Sept. 3, 1935 |
| 2,255,717 | Tyler | Sept. 9, 1941 |
| 2,350,272 | Cobb | May 30, 1944 |